Aug. 5, 1952  L. J. HEXEL  2,606,021
SUSPENSION

Filed Sept. 21, 1945  2 SHEETS—SHEET 1

INVENTOR.
Leopold J. Hexel.
BY
Harness and Harris
ATTORNEYS.

Aug. 5, 1952  L. J. HEXEL  2,606,021
SUSPENSION
Filed Sept. 21, 1945  2 SHEETS—SHEET 2
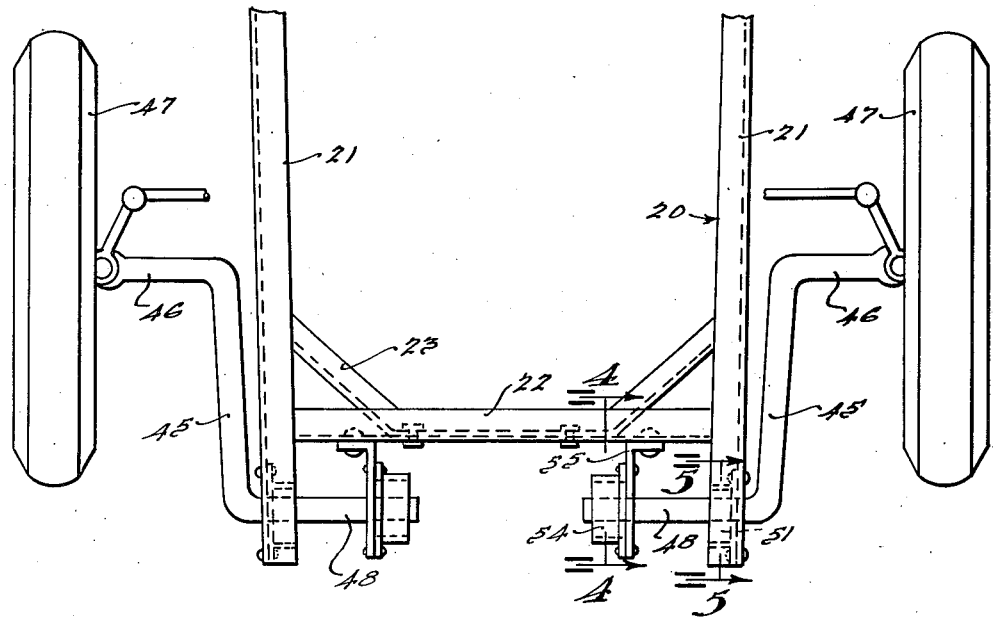
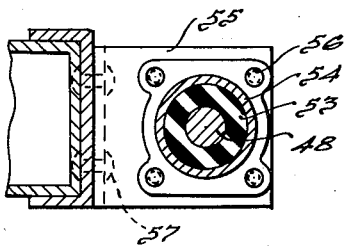
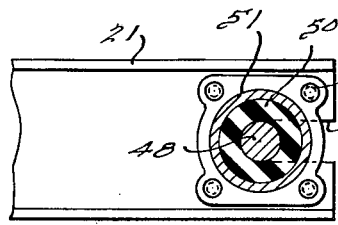
INVENTOR.
Leopold J. Hexel
BY
Harness and Harris
ATTORNEYS.

Patented Aug. 5, 1952

2,606,021

UNITED STATES PATENT OFFICE 2,606,021

SUSPENSION

Leopold J. Hexel, Detroit, Mich., assignor to Chrysler Corporation, Highland Park, Mich., a corporation of Delaware Application September 21, 1945, Serial No. 617,725

6 Claims. (Cl. 267—58)

The present invention relates to a suspension system. More specifically it relates to a suspension system in which the vibrations due to shocks fade out in less time than in ordinary suspension systems. The suspension system may be applied to an automotive vehicle.

An object of the present invention is to provide an improved suspension system in which the vibrations will die out in a relatively short time. This suspension system may be used in automotive vehicles.

A further object is the provision of an improved resilient suspension involving a plurality of springs in which the springs are loaded or stressed differently. The springs may take any suitable form including coil and resilient annulus and may be stressed in any desired way under loads such as in compression, tension, or torsion.

Other objects will appear from the disclosure.

Figure 1:
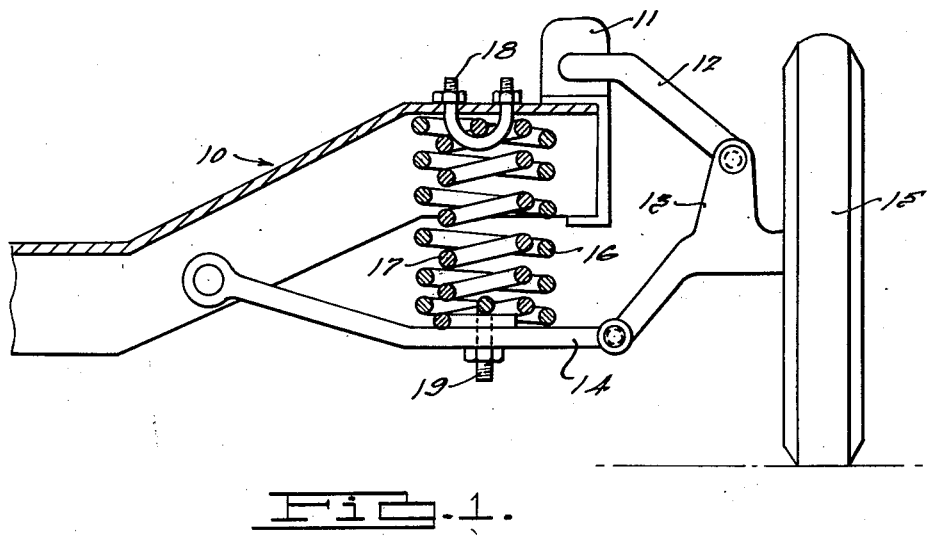
Fig. 1 is a front elevation partially in section of one end of the vehicle frame and the steerable wheel connected thereto, showing one form of the present invention.

Fig. 3 is a plan view of the part of a vehicle frame and steerable wheels connected thereto by means forming a third form of the present invention; and Figs. 4 and 5 are sectional views taken on the lines 4—4 and 5—5 of Fig. 3 respectively.

The reference character 10 designates a vehicle frame upon which is mounted a bracket 11 to which is pivotally connected an upper link 12. The upper end of a knuckle 13 is pivotally connected to one end of the upper link 12 and the lower end of the knuckle is pivotally connected to one end of a lower link 14, the other end of which is pivotally connected to the vehicle frame 10. A steerable wheel 15 is attached to the knuckle 13. An outer coil spring 16 acts between the under side of the vehicle frame 10 and the lower link 14, being somewhat compressed at static load of the vehicle frame and being compressed to a greater degree at a load on the vehicle frame greater than the static load. An inner coil spring 17 is positioned within the outer coil spring 16 and is connected at its upper end to the under side of the vehicle frame 10 by a U-bolt 18 and at its lower end to the lower link 14 by a U-bolt 19. The inner coil spring 17 is so proportioned with respect to the outer coil spring 16, the lower link 14, and the vehicle frame 10 and a light load such as that imposed by the unloaded vehicle, that the spring 17 is neither compressed nor tensioned at the light load, is compressed at a load greater than the light load, and is tensioned at a load less than the light load, i. e., under rebound conditions, for example.

Figure 2:
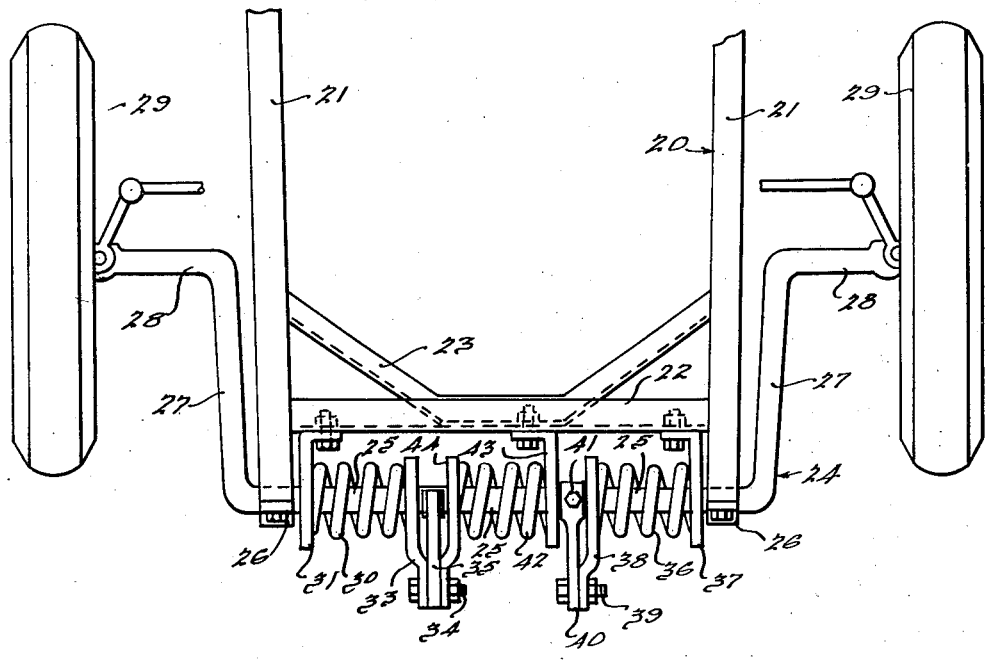
Fig. 2 is a plan view of the part of a vehicle frame and steerable wheels connected thereto by means forming a second form of the present invention.

In the form of invention shown in Fig. 2, a vehicle frame 20 comprises side members 21, a transverse member 22, and a reinforcing structure 23 between the transverse and side members. A member 24 has a central portion 25, the ends of which are journalled on the frame side members 21 with the aid of parts 26. The central portion 25 extends transversely of the vehicle frame 20 and from the ends of the central portion extend arm portions 27 along the frame side members 21. From the ends of the arm portions 27 extend portions 28 to which steerable wheels 29 are attached. A coil spring 30 surrounds the central portion 25 of the member 24 and has one end secured to a bracket 31 bolted to the transverse member 22 and the other end secured to a part 33 bolted as indicated at 34 to a member 35 secured by soldering or welding to the central portion 25 of the member 24. A coil spring 36 surrounds the central portion 25 and has one end secured to a bracket 37 bolted to the transverse member 22 and the other end secured to a part 38 bolted as indicated at 39 to a member 40 secured by a screw 41 to the central portion 25. Between the coil springs 30 and 36 is located a coil spring 42 which surrounds a central portion 25 of the member 24 and has one end secured to a bracket 43 bolted to the transverse member 22 and the other end secured to a part 44 bolted as indicated at 34 to the member 35. When the vehicle frame 20 carries only static load the springs 30 and 36 are under a certain torsional stress and are under a greater torsional stress at a greater load on the vehicle frame. As the vehicle frame becomes loaded, the left hand arm 27 tends to move forward from the plane of the drawing and thereby acts through the part 33 and the member 35 to tend to unwind the coil spring 30. The reverse is true of the coil spring 36. Increase in loading on the vehicle frame tends to wind up the spring 36. The coil spring 42 is so proportioned with respect to the other coil springs and the remaining vehicle parts that at static load of the vehicle it is free of torsional stress, i. e., it tends neither to unwind or to wind; at a load greater than static load it is wound up and is thereby subjected to a torsional stress in one sense; at a load less than static load, which may occur, for example, on rebound, it is unwound and placed under torsional stress in the opposite sense.

In the form of Fig. 3 the single wheel-carrying member 24 is replaced by a pair of arms 45 having main portions extending along the frame side members 21, a transverse wheel connected portion 46 at one end for steerable wheels 47 and a transverse mounting portion 48 at the other end. As seen in Fig. 5 the end of each frame side member 21 is slotted as indicated at 49 for the proper positioning of an arm 45, a rubber ring 50, and a bracket 51. The ring 50 is stated to be formed of rubber but this is by way of example only, since it may be formed of any suitable resilient, elastic material. The outer periphery of the ring 50 is bonded to the bracket 51, which is bolted as indicated at 52, to the frame side member 21. The inner periphery of the ring 50 is bonded to the mounting portion 48 of the arm 45. At static load upon the vehicle frame 21 the resilient ring 50 is subjected to torsional stress in a certain sense, and at a greater load is subjected to a greater torsional stress in the same sense. As shown in Fig. 4, there are also for the mounting portion of each arm 45 a ring 53, which may be formed of rubber by way of example or of any other suitable resilient, elastic material, a bracket 54, and a bracket 55 bolted as indicated at 56 to the bracket 54 and as indicated at 57 to the transverse member 22. The outer periphery of the elastic ring 53 is bonded to the bracket 54 and the inner periphery of the ring 53 is bonded to the mounting portion 48 of the arm 45. When the vehicle frame 20 is under static load each ring 53 is free of torsional stress. When the vehicle frame is under greater than static load each ring 53 is twisted or subjected to torsional stress in one sense. When the vehicle frame is under less than static load, for example, at the time of rebound, each ring 53 is twisted or subjected to torsional stress in the opposite sense.

In each of the above described arrangements, involving a plurality of springs or elastic supporting means, one being stressed at static load, and the other being unstressed at static load and connected so as to be stressed in one direction or sense at greater than static load and in the other direction or sense at less than static load, the springs or elastic supporting means may be made soft so that the vibrations therein are slow, and yet fade out at a relatively rapid rate because of the arrangement of stressed and unstressed springs. In each of the above described examples, one spring or elastic supporting means is stated to be unstressed at the condition of static load. However, this is not an absolute requirement, for it may be stressed in one sense or direction or the other at static load. The essential thing is that in any one spring arrangement one spring be differently stressed from the other spring and be capable of assuming stress in one sense or direction at one load and assuming stress in the opposite sense or direction at a different load.

I claim:

1. In a vehicle, a frame, a member having a central portion extending transversely across the frame and mounted thereon and wheel-carrying arm portions extending generally transversely from the ends of the central portion along the frame, first and second coil springs surrounding the central portion of the member adjacent the sides of the frame and being attached at one end to the frame and at the other to the central portion of the member, one of the first and second coil springs being subjected to torsional stress in one sense at light load of the vehicle frame and to greater torsional stress in the said one sense at a greater load, the other of the first and second coil springs being subjected to torsional stress in a given sense at light load of the vehicle frame and to a greater torsional stress in the said given sense at a greater load, and a third coil spring surrounding the central portion of the member between the first and second coil springs and connected to the central portion and the frame so as to be free of torsional stress at light load and to be subjected to torsional stress in a certain sense at a load greater than light load and in the opposite sense at a load less than light load.

2. In a vehicle, a frame, a member having a central portion extending transversely across the frame and mounted thereon and wheel-carrying arm portions extending generally transversely from the ends of the central portion along the frame, first and second coil springs surrounding the central portion of the member adjacent the sides of the frame and being attached at one end to the frame and at the other to the central portion of the member, one of the first and second coil springs being subjected to torsional stress in one sense at light load of the vehicle frame and to greater torsional stress in the said one sense at a greater load, the other of the first and second coil springs being subjected to torsional stress in a given sense at light load of the vehicle frame and to a greater torsional stress in the said given sense at a greater load, and a third coil spring surrounding the central portion of the member between the first and second coil springs and connected to the central portion and the frame so as to be free of torsional stress at a certain load at which the first and second coil springs are subjected to torsional stress and subjected to torsional stress in a certain sense at a load greater than the certain load in the opposite sense at a load less than the certain load.

3. Vehicle structure comprising a load-carrying supported part having a longitudinal axis, another part supporting said load-carrying supported part generally adjacent one side thereof including a crank-arm having a portion mounted generally transversely of said longitudinal axis for rotation relative to the load-carrying supported part and wheel carrying means carried by said transverse portion for swinging movement at said one side of the load-carrying supported part in combination with first paired bracket means mounted one to each said part and defining a first space along said transverse portion of the crank-arm, second paired bracket means mounted one to each said part and defining a second discrete space separated from said first space along the transverse portion of the crank-arm, of first and second helical torsion springs surrounding the said transverse portion in disposition in the first and second spaces respectively, said first torsion spring having one end anchored to the first bracket means component mounted to the supported part and the other end so connected for rotation with the first bracket means component mounted to the supporting part as to be free of torsional stress at a predetermined positive loading of the supported part and torsionally stressed in opposite senses at greater or less positive loadings respectively, said second torsion spring having one end anchored to the second bracket means component mounted to the supported part and the other end so connected for rotation with the second bracket component mounted to the supporting part as to be free of torsional stress at a second predetermined loading such that at loadings intermediate said predetermined loadings the springs act against each other and at loadings beyond said predetermined loadings the springs act together, said second predetermined loading being a said less positive loading than the first named predetermined loading.

4. Vehicle structure comprising a load-carrying supported part having a longitudinal axis, another part supporting said load-carrying supported part generally adjacent one side thereof including a crank-arm having a portion mounted generally transversely of said longitudinal axis for rotation relative to the load-carrying supported part and wheel carrying means carried by said transverse portion for swinging movement at said one side of the load-carrying supported part in combination with first paired bracket means mounted one to each said part and defining a first space along said transverse portion of the crank-arm, second paired bracket means mounted one to each said part and defining a second discrete space separated from said first space along the transverse portion of the crank-arm, of first and second helical torsion springs surrounding the said transverse portion in disposition in the first and second spaces respectively, said first torsion spring having one end anchored to the first bracket means component mounted to the supported part and the other end so connected for rotation with the first bracket means component mounted to the supporting part as to be free of torsional stress at a predetermined positive loading of the supported part and torsionally stressed in opposite senses at greater or less positive loadings respectively, said second torsion spring having one end anchored to the second bracket means component mounted to the supported part and the other end so connected for rotation with the second bracket component mounted to the supporting part as to be free of torsional stress at a second predetermined loading such that at loadings intermediate said predetermined loadings the springs act against each other and at loadings beyond said predetermined loadings the springs act together, said second predetermined loading being a said less positive loading than the first named predetermined loading, and a similar supporting part on the opposite side of the load-carrying supported part having associated therewith bracket means and a helical torsion spring similar to said second bracket means and helical torsion spring.

5. Vehicle structure comprising a load-carrying supported part having a longitudinal axis, another part supporting said load-carrying supported part generally adjacent one side thereof including a crank-arm having a portion mounted generally transversely of said longitudinal axis for rotation relative to the load-carrying supported part and wheel carrying means carried by said transverse portion for swinging movement at said one side of the load-carrying supported part in combination with first paired bracket means mounted one to each said part and defining a first space along said transverse portion of the crank-arm, second paired bracket means mounted one to each said part and defining a second discrete space separated from said first space along the transverse portion of the crank-arm, of first and second helical torsion springs surrounding the said transverse portion in disposition in the first and second spaces respectively, said first torsion spring having one end anchored to the first bracket means component mounted to the supported part and the other end so connected for rotation with the first bracket means component mounted to the supporting part as to be free of torsional stress at a predetermined positive loading of the supported part and torsionally stressed in opposite senses at greater or less positive loadings respectively, said second torsion spring having one end anchored to the second bracket means component mounted to the supported part and the other end so connected for rotation with the second bracket component mounted to the supporting part as to be free of torsional stress at a second predetermined loading such that at loadings intermediate said predetermined loadings the springs act against each other and at loadings beyond said predetermined loadings the springs act together, said second predetermined loading being a said less positive loading than the first named predetermined loading, and a similar supporting part on the opposite side of the load-carrying supported part having associated therewith bracket means and a helical torsion spring similar to a certain said bracket means and helical torsion spring.

6. In a vehicle, a frame, an arm having a wheel-attaching portion at one end and a mounting portion at the other end generally transverse to the body of the arm, means mounting the frame on the arm by the mounting portion thereof, a first helically-wound torsion coil spring having a part secured thereto and carried thereby at one end, and having a bracket secured thereto at the opposite end, said first helically-wound torsion coil spring surrounding the mounting portion of the arm, means including a bolt detachably connecting the bracket and the frame, a second helically-wound torsion coil spring having a second part secured thereto and carried thereby at one end and having a second bracket secured thereto at the opposite end, means including a bolt detachably connecting the second bracket and the frame, said second helically-wound torsion coil spring surrounding the mounting portion of said arm and said first and second helically-wound torsion coil springs being aligned with one another in axially spaced relation, an arm-connected member juxtaposed to each said spring-carried part, and bolt means detachably connecting each part and arm-connected member so as to subject the first spring to torsional stress in one sense at light load of the frame and to a greater torsional stress in the said one sense at a greater load, and so as to subject the second spring to torsional stress in a certain sense at a load greater than light load and in the opposite sense at a load less than light load and free of torsional stress at light load.

LEOPOLD J. HEXEL.

REFERENCES CITED

The following references are of record in the file of this patent:

UNITED STATES PATENTS

| Number | Name | Date |
|---|---|---|
| 402,894 | Booth | May 7, 1889 |
| 571,972 | Janney | Nov. 24, 1896 |
| 830,454 | Sager | Sept. 4, 1906 |
| 1,361,002 | Bock | Dec. 7, 1920 |
| 1,486,295 | Mullen | Mar. 11, 1924 |
| 2,270,571 | Woolson et al. | Jan. 20, 1942 |

FOREIGN PATENTS

| Number | Country | Date |
|---|---|---|
| 342,649 | France | July 13, 1904 |
| 622,890 | France | Mar. 8, 1927 |
| 772,052 | France | Aug. 6, 1934 |
| 659,945 | Germany | May 13, 1938 |
| 717,634 | Germany | Feb. 19, 1942 |
| 320,855 | Great Britain | Oct. 17, 1929 |
| 542,409 | Great Britain | Jan. 8, 1942 |